US012670472B2

(12) United States Patent
     Pachauri et al.

(10) Patent No.:     US 12,670,472 B2
(45) Date of Patent:         Jun. 30, 2026

(54) GLOBAL AND LOCAL CATEGORY-BASED ITEM LOCATION FILTERING

(71) Applicant: Walmart Apollo, LLC, Bentonville, AR (US)

(72) Inventors: Abhinav Pachauri, Banaglore (IN); Raghava Balusu, Andhra Pradesh (IN); Zhaoliang Duan, Frisco, TX (US); William Craig Robinson, Centerton, AR (US); Benjamin Ellison, San Francisco, CA (US); Lingfeng Zhang, Flower Mound, TX (US); Mingquan Yuan, Flower Mound, TX (US); Avinash Madhusudanrao Jade, Karnataka (IN); Eric W. Rader, Plano, TX (US); Elizabeth Ann Siler, Rogers, AR (US); Zhiwei Huang, Flower Mound, TX (US); Jing Wang, Dallas, TX (US); Rongdong Chai, Allen, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 216 days.

(21) Appl. No.: 18/530,303

(22) Filed: Dec. 6, 2023

(65) Prior Publication Data

US 2025/0190943 A1     Jun. 12, 2025

(51) Int. Cl.
     *G06Q 10/0875*         (2023.01)
     *G06V 10/762*          (2022.01)

(52) U.S. Cl.
     CPC ....... *G06Q 10/0875* (2013.01); *G06V 10/763* (2022.01); *G06V 2201/07* (2022.01); *G06V 2201/10* (2022.01)

(58) Field of Classification Search
     CPC ............ G06Q 10/0875; G06V 10/763; G06V 2201/07; G06V 2201/10
     See application file for complete search history.

(56) References Cited

U.S. PATENT DOCUMENTS

| | | | |
|---|---|---|---|
| 7,392,948 | B2 | 7/2008 | Smith et al. |
| 9,672,489 | B1 | 6/2017 | Kangas et al. |

(Continued)

OTHER PUBLICATIONS

Swedberg, "Wakefern Achieves Inventory Management with Computer Vision and AI", Oct. 2023, https://www.rfidjournal.com/news/wakefern-achieves-inventory-management-with-computer-vision-and-ai/200659/) (Year: 2023).*

(Continued)

*Primary Examiner* — Allen C Chein
(74) *Attorney, Agent, or Firm* — Foley IP Law, PLLC

(57)                  ABSTRACT

A system and method for global and local category-based item location recognition filtering is provided. A plurality of candidate items associated with a current location within a retail environment are filtered using a global level filter that identifies and removes items associated with an item category that is not a confirmed category for the recognized location. A local level filter analyzes item count values for the remaining candidate items to identify and remove low-count items. If any single item count is below a threshold, the low count items are removed. If all the candidate items are low count items at the item level, a count values for all candidate items in the same category are aggregated into a category-level item count value which is used to identify low count items. The low-count items are filtered out to eliminate false positives for improved accuracy and reliability of the item-to-location mapping results.

20 Claims, 14 Drawing Sheets

(56) References Cited

U.S. PATENT DOCUMENTS

| | | | | |
|---|---|---|---|---|
| 2009/0121017 A1* | 5/2009 | Cato | .................... | G06Q 10/087 |
| | | | | 235/385 |
| 2012/0161967 A1* | 6/2012 | Stern | .................... | G06Q 10/087 |
| | | | | 340/572.1 |
| 2017/0178060 A1* | 6/2017 | Schwartz | ............. | G06Q 10/087 |
| 2019/0149725 A1* | 5/2019 | Adato | ...................... | H04N 1/00 |
| | | | | 348/158 |
| 2021/0158278 A1 | 5/2021 | Bogolea et al. | | |
| 2023/0252407 A1 | 8/2023 | Kim et al. | | |

OTHER PUBLICATIONS

Varol et al., "Toward retail product recognition on grocery shelves" Proceedings vol. 9443, Sixth International Conference on Graphic and Image Processing (ICGIP 2014); 944309 (2015) https://doi.org/10.1117/12.2179127 Event: Sixth International Conference on Graphic and Image Processing (ICGIP 2014), 2014, Beijing, China, 7 pages.

\* cited by examiner

Figure 1:
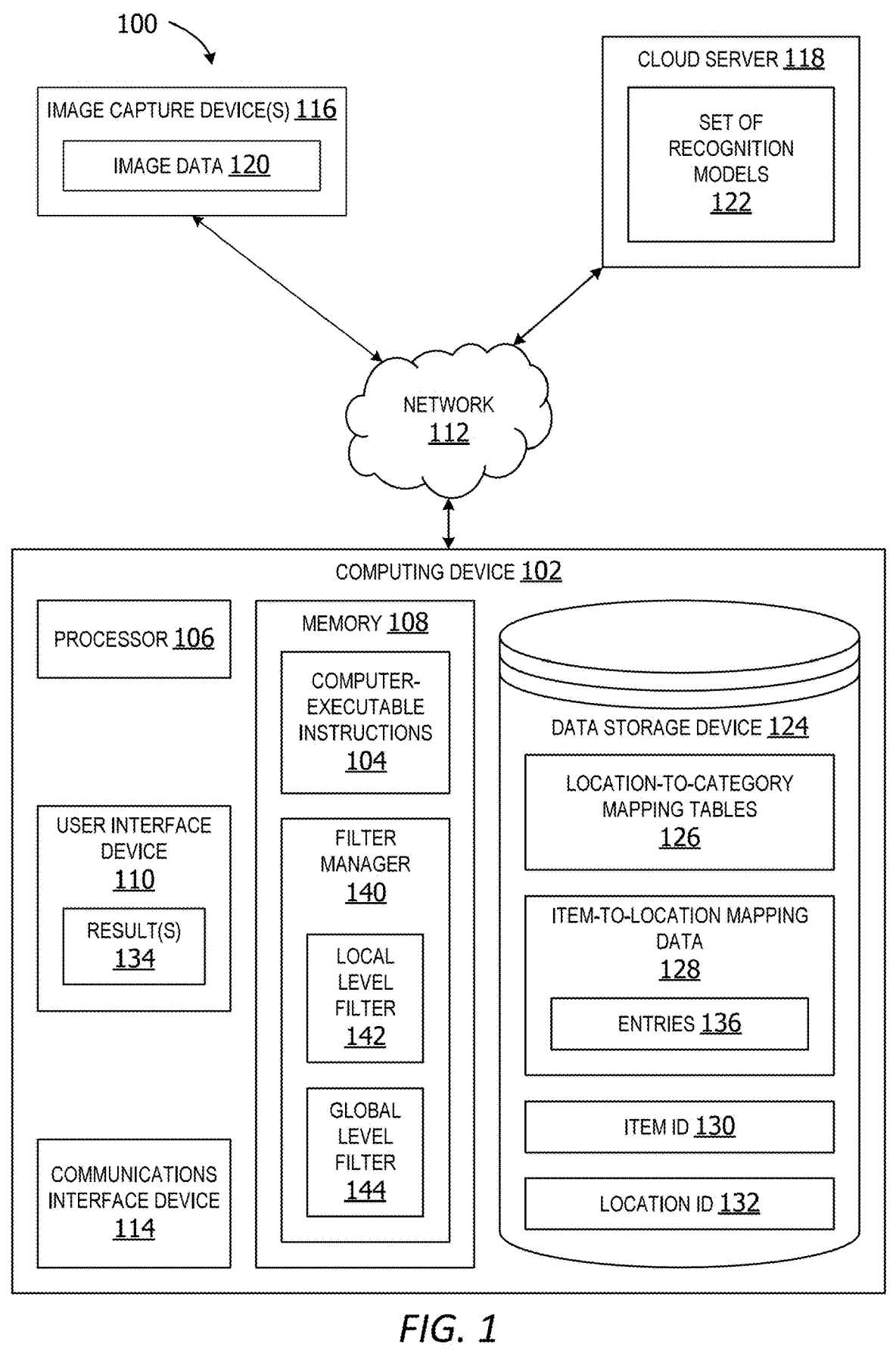

100

IMAGE CAPTURE DEVICE(S) 116

IMAGE DATA 120

CLOUD SERVER 118

SET OF RECOGNITION MODELS 122

NETWORK 112

COMPUTING DEVICE 102

PROCESSOR 106

MEMORY 108

COMPUTER-EXECUTABLE INSTRUCTIONS 104

USER INTERFACE DEVICE 110

RESULT(S) 134

FILTER MANAGER 140

LOCAL LEVEL FILTER 142

GLOBAL LEVEL FILTER 144

COMMUNICATIONS INTERFACE DEVICE 114

DATA STORAGE DEVICE 124

LOCATION-TO-CATEGORY MAPPING TABLES 126

ITEM-TO-LOCATION MAPPING DATA 128

ENTRIES 136

ITEM ID 130

LOCATION ID 132

IMAGE DATA
120

SET OF RECOGNITION MODELS 122

ITEM RECOGNITION MODEL 302

LOCATION RECOGNITION MODEL 306

ITEM ID
304

LOCATION ID
308

FILTER MANAGER 140

GLOBAL LEVEL FILTER 144

CATEGORY
310

CONFIRMED CATEGORIES
312

UNCONFIRMED CATEGORY
ITEM(S)
312

LOCAL LEVEL FILTER 142

HIGH COUNT ITEM(S) 316

ITEM LEVEL 318

CATEGORY LEVEL 320

LOW COUNT ITEM(S) 322

ITEM LEVEL 324

CATEGORY LEVEL 326

800

900

START

OBTAIN A PLURALITY OF CANDIDATE ITEMS
IDENTIFIERS RECOGNIZED CURRENT LOCATION
902

PERFORM GLOBAL LEVEL FILTERING
904

UNCONFIRMED
CATEGORY
906

NO

YES

REMOVE UNCONFIRMED CATEGORY ITEMS
904

PERFORM LOCAL LEVEL FILTERING
910

LOW COUNT
912

NO

YES

REMOVE LOW COUNT ITEMS
914

GENERATE ITEM-TO-LOCATION MAPPING
916

END

1000

1100

1200

| Location | Categories |
|---|---|
| FP – Produce and Floral | Produce and Floral |
| FM – Fresh Meat | Frozen Seafood, Fresh Seafood, Frozen Meat etc. |
| G - Grocery | Coffee, Breakfast, Oils, Rice etc. |
| H - Hardline | Home Improvement, Office Furniture, Automotive and Oil |
| C- Central | Candy, Toys, WINE etc. |
| E- Electronics | TV / Soundbars / Blu-Ray / Major Appliances etc. |

1300

| Category Number | Category Description | Primary Zone | Secondary Zone | Tertiary Zone | Zone Distribution |
|---|---|---|---|---|---|
| 2 | Health and Beauty Aids | W | G | C | W:77%, G:12%, H:10% |
| 11 | Home Improvement | H | G | | H:81%, G:19% |
| 79 | Prepared Foods | FM | | | FM:99%, FF:1% |

1400

| Item | Location |
|------|----------|
| Item A | BIN D14 and D15 |
| Item B | BIN C24 |
| Item C | BIN B18 and B19 |
| Item D | BIN A54 |

*FIG. 14*

GLOBAL AND LOCAL CATEGORY-BASED ITEM LOCATION FILTERING

BACKGROUND

One of the primary challenges in inventory management is accurately determining the locations of products within a retail facility. Computer vision item recognition can be used to analyze images of products within a store or other retail facility to automatically identify products and product locations. However, computer vision object identification results are typically unreliable due to several key factors, such as incorrect location predictions, instances where no location prediction is available, misplaced products within the retail facility, recognition of customer carts containing a mix of random products, and neighboring bin product recognitions resulting in false positives. These false positives frequently render the item and location recognition results inaccurate and unreliable. The results can be manually verified and corrected by human users; however, this method can be a laborious, impractical, and time-consuming process.

SUMMARY

Some embodiments provide a system for category-based item location filtering to remove false positives occurring as a result of computer vision object detection more effectively and accurately. The system includes a computer-readable medium storing instructions that are operative upon execution by a processor to obtain a plurality of candidate items associated with a recognized location within a retail facility. Each candidate item in the plurality of candidate items includes an item recognized using an image of the candidate item and the recognized location by a set of recognition models. The system performs a global level filtering on the plurality of candidate items removing any candidate items associated with an item category that is unconfirmed for the recognized location using a location-to-category mapping table and an item-to-category mapping table. The system performs a local level filtering on the plurality of candidate items removing low count items associated with the recognized location to eliminate false positive results associated with item-location recognition results generated by the set of recognition models. The system generates an item-to-location mapping result that includes a mapping of each candidate item remaining within the plurality of candidate items to the recognized location following completion of the global level filtering and the local level filtering. The item-to-location mapping result is presented to a user via a user interface device for more accurate identification of item locations within the retail facility.

Other embodiments provide a method for category-based item location filtering to remove false positives. A filter manager obtains a plurality of candidate items associated with a recognized location within a retail facility. The filter manager removes a first set of candidate items associated with an item category that is unconfirmed for the recognized location using a global level filter. The confirmed categories for the recognized location are obtained from a location-to-category mapping table. The item category is obtained from an item-to-category mapping table. The filter manager removes a second set of candidate items from the plurality of candidate items having a low item-level count within the recognized location using a local level filter. The second set of candidate items includes low count items absent from a set of category-to-high count items associated with the recognized location. The filter manager generates an itemto-location mapping result including a mapping of each candidate item remaining within the plurality of candidate items to reduce false positive item-location results generated by the recognition model.

Still other embodiments provide a computer storage devices having computer-executable instructions stored thereon, which, upon execution by a computer, are operative to obtain a plurality of candidate items associated with a recognized location within a retail facility. A global level filtering is performed on the plurality of candidate items. The global level filtering includes identifying a set of unconfirmed category items and a set of confirmed category items in the plurality of items using an item-to-category mapping table. An item in the set of confirmed category items includes a candidate item associated with a category matching a confirmed category in a plurality of confirmed categories associated with the recognized location. The set of unconfirmed category items is removed from the plurality of candidate items. An item in the set of unconfirmed category items comprises a candidate item associated with a category absent from the plurality of confirmed categories. A local level filtering is performed on the set of confirmed category items. The local level filtering includes identifying a set of item-level low count items having an item count within the recognized location which is less than a majority threshold. The set of item-level low count items is removed from the plurality of candidate items. An item-to-location mapping is generated for each unfiltered candidate item remaining in the plurality of candidate items within a dynamic item-location map. An unfiltered item is an item that is absent from the set of unconfirmed category items and the set of item-level low count items to remove false positives associated with the set of recognition models.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is an exemplary block diagram illustrating a system for category-based item location filtering to remove false positives.

FIG. 14 is an exemplary location-to-item mapping result.

Corresponding reference characters indicate corresponding parts throughout the drawings.

DETAILED DESCRIPTION

Figure 2:
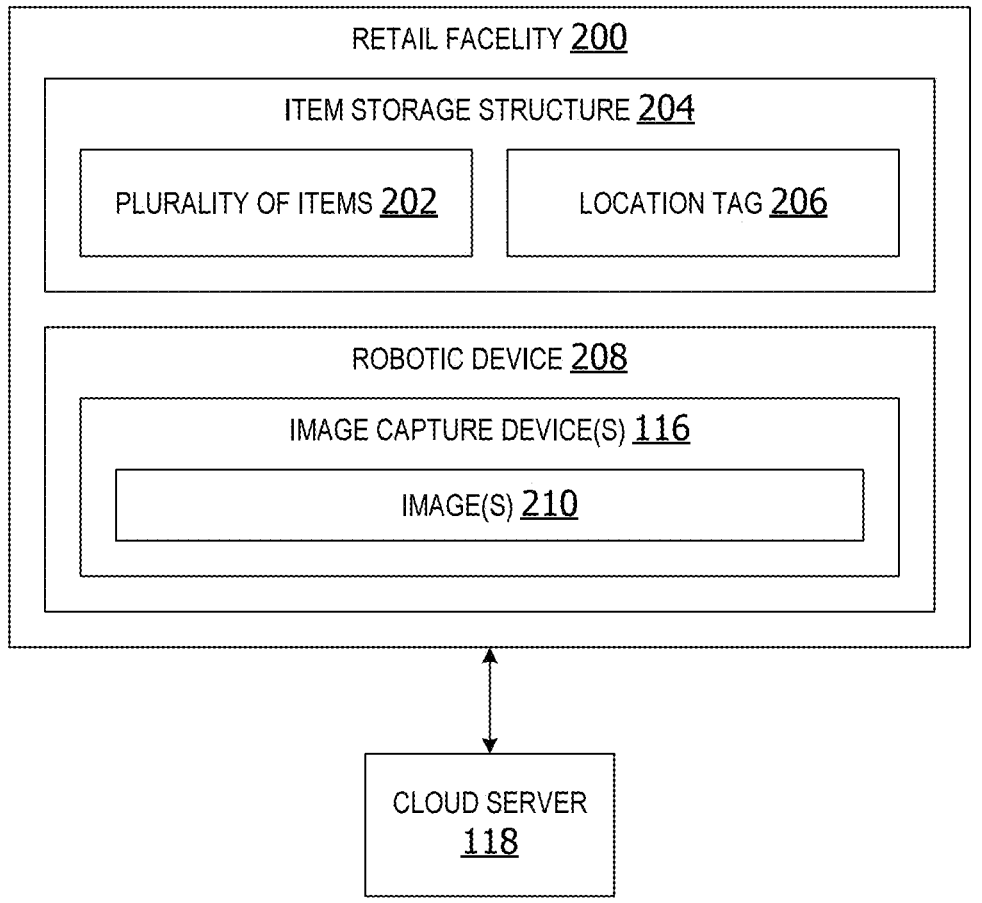
FIG. 2 is an exemplary block diagram illustrating a system for item-to-location mapping based on image data generated by one or more robotic image capture devices associated with a retail facility.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some embodiments, . . . " For brevity and clarity of presentation, this implied leading clause is not repeated ad nauseum.

Accurately determining the location of items in a store or other retail environment can be difficult, time-consuming, resource intensive, and unreliable using image data and automated computer vision image analysis. Item recognition as a service (IRAS) can be used for automating recognition of items and item locations within images generated by image capture devices within the store. Item recognition is performed using a price tag model which leverages item price tags and keyword feature vector (KWFV) models which leverage textual and visual features of items. Dedicated location recognition models are used for location determination using location tags associated with bins, shelving, and other item storage structures within the retail facility. Despite achieving individual product recognition accuracies of over 95%, item and location recognition results fail to meet expectations because of several key factors, such as, but not limited to, incorrect location predictions, instances where no location prediction is made, items misplaced within the retail environment, recognition of items in customer carts and failure to link an item to the correct bin, display case, or other item storage structure. These findings highlight the need for additional post-processing steps to address these challenges and enhance the performance of the image analysis models.

Referring to the figures, examples of the disclosure enable category-based floor item location filtering to remove false positives. In some embodiments, a global level filter is applied to item and location recognition data to remove items associated with a category that is not included in a list of confirmed categories of items which are expected to be found within the recognized location. The global level filter removes false positives associated with misplaced items, mis-identified items, items in customer carts and other items which are identified in a section of a store or other retail environment where the item is not normally stocked. This enables more accurate and reliable results with fewer false positives at the store section (global) level.

Aspects of the disclosure further enable a local level filter that identifies items which are in the correct section of the retail facility which are located in a low count, such as a single instance of the item or only two or three instances of the item. An item having a low count suggests the item may be in the correct section of the store but located within the wrong shelf, bin, display case, or other area or cluster of items. In other words, if a single instance of an item A is located within a cluster of a dozen different instances of an item B, the instance of the item A is likely misplaced or otherwise represents a false positive. The local level filter removes these low count items to further reduce false positives and improve accuracy and reliability of the item location recognition results. This further reduces time and labor expended by users manually verifying item location recognition data for improved efficiency.

Other embodiments include a filter manager that performs global and local level filtering on item and location recognition data used to generate a more accurate and reliable item-to-location mapping used to locate items within the retail facility. The item-to-location mapping is presented to users via a user interface (UI) device. This further improves user efficiency via UI interaction and increased user interaction performance.

The item-to-location mapping results generated using the filtered item and location recognition data includes no false positives or fewer false positives for an improved error rate. This further reduces system resource usage, such as processor usage and memory usage, due to fewer manual updates of the item-location mapping by users to correct errors in the item location recognition data.

The computing device operates in an unconventional manner by automatically removing false positives from item and location recognition data via global and local level category-based filtering, thereby reducing item-to-location mapping errors. This allows for fewer manual updates and corrections to the data, as well as minimizing network bandwidth usage which would otherwise be consumed by users transmitting corrected item location mapping data where the system eliminates most, if not all, false positives. In this manner, the filter manager executing on the computing device allows reduced usage of processing resources, memory resources, and network resources due to more accurate item location mapping results and reduced error rate, thereby improving the functioning of the underlying computing device.

In other embodiments, the filter manager provides more accurate item to location mapping in a reduced amount of time. This enables increased speed providing dynamic item-to-location mapping for use in assisting user in locating items in a large retail facility for reduced user time and effort spent searching for items, such as locating pallets or other items for restocking shelves, pallet management, inventory management, etc.

Referring now to FIG. 1, an exemplary block diagram illustrates a system 100 for category-based item-location filtering to remove false positives. In the example of FIG. 1, the computing device 102 represents any device executing computer-executable instructions 104 (e.g., as application programs, operating system functionality, or both) to implement the operations and functionality associated with the computing device 102. The computing device 102, in some embodiments includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some embodiments, the computing device 102 has at least one processor 106 and a memory 108. The computing device 102, in other embodiments includes a user interface device 110.

The processor 106 includes any quantity of processing units and is programmed to execute the computer-executable instructions 104. The computer-executable instructions 104 are performed by the processor 106, performed by multiple processors within the computing device 102 or performed by a processor external to the computing device 102. In some embodiments, the processor 106 is programmed to execute instructions such as those illustrated in the figures (e.g., FIG. 9, FIG. 10, and FIG. 11).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other embodiments, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other embodiments, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a camera, a vibration motor, one or more accelerometers, wireless broadband communication (LTE) module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other embodiments, the network 112 is a local or private LAN.

In some embodiments, the system 100 optionally includes a communications interface device 114. The communications interface device 114 includes a network interface card and/or computer-executable instructions (e.g., a driver) for operating the network interface card. Communication between the computing device 102 and other devices, such as but not limited to one or more image capture device(s) 116 and/or a cloud server 118, can occur using any protocol or mechanism over any wired or wireless connection. In some embodiments, the communications interface device 114 is operable with short range communication technologies such as by using near-field communication (NFC) tags.

The image capture device(s) 116 includes one or more devices for generating one or more images of one or more items in a retail facility. The image capture device(s) generates image data 120. The image data 120 includes data associated with one or more images captured by the image capture device(s) 116.

In some embodiments, the image capture device(s) 116 generate raw image data 120, including a plurality of images of one or more items at one or more locations, such as within a retail environment, for example, but not limited to, the retail facility 200 shown in FIG. 2 below. In one example, the image capture device(s) 116 captures a series of overlapping images of each location, such as a bin or a portion of a bin. The system selects a sampling of the images, such as selecting five images of the location. The selected images are input to one or more detection models and one or more recognition models to identify a one or more items at the current location of the image capture device(s) 116 at the time the image data 120 is generated.

The image data 120, in some embodiments, is input into one or more detection models which analyze the image data and place bounding boxes around each detected object detected in the image(s). The detection model(s) detect any objects possible, such as price tags, location tags, items, bins, portions of bins or other shelving, etc. The object detection model(s) place bounding boxes around objects in the image(s) which are detected by the detection model(s) and crops the images to extract the detected object from the image(s). The one or more cropped image(s) having the bounding boxes surrounding detected objects are provided as input to one or more recognition models, such as, but not limited to, the set of recognition models 122. Detection models detect all kinds of objects in the image data.

The image data, including the bounding boxes surrounding the detected images are input into the set of recognition models 122. The one or more recognition models in the set of recognition models 122 analyzes the image data 120 to identify (recognize) each object associated with a bounding box in the image data. The recognition model(s) attempt to recognize each object in each bounding box, whether that object is an item, item tag, location tag, etc. The recognition model(s) identify (recognize) the items and locations using item identifier tags and/or location tags visible in the captured image(s) associated with the image data 120. The recognized items and/or location(s) are provided as input to the filter manager 140 for global and local category-based items and location recognition filtering to eliminate false positive item recognition. This prevents mapping of the recognized location to misplaced items, items in customer carts, etc.

The cloud server 118 is a logical server providing services to the computing device 102 or other clients, such as, but not limited to, a user device (not shown). The cloud server 118 is hosted and/or delivered via the network 112. In some non-limiting examples, the cloud server 118 is associated with one or more physical servers in one or more data centers. In other embodiments, the cloud server 118 is associated with a distributed network of servers.

In the example shown in FIG. 1, the server 118 hosts a set of one or more recognition models 122. A recognition model in the set of recognition models is an image recognition as a service (IRAS) type model which analyzes image data 120 to identify items and/or locations within the retail facility. In this example, the set of recognition models 122 includes an item recognition model trained to recognize items. The set of recognition models 122 also includes a location recognition model trained to recognize a location associated with the retail facility. In this example, the set of recognition models 122 is executed on the cloud server 118. However, in other embodiments, the set of recognition models 122 are executed on a computing device, such as, but not limited to, the computing device 102.

The system 100 can optionally include a data storage device 124 for storing data, such as, but not limited to a location-to-category mapping table 126, item-to-location mapping data 128, item identifier (ID) 130 for one or more candidate items and/or location ID 132 for one or more recognized locations. The location-to-category mapping table 126 is a table for storing location-to-category mapping data associated with categories mapped to each location in the retail facility, such as, but not limited to, the location-to-category mapping table 1200 shown in FIG. 12 below.

The item-to-location mapping data 128 is data associated with candidate items mapped to current locations of the items in the recognized location. The items in the item-to-location mapping data 128 are items that have already been filtered by the filter manager 140 to remove false positive item location identifications generated by the set of recognition models 122 based on the image data 120. Each item in the item-to-location mapping data 128 includes an entry for inclusion in the item-to-location mapping results 134. The item-to-location mapping entries 136 includes data, such as an item ID and location ID for the current location of the item in the retail facility. The item-to-location mapping data entries 136 optionally also include one or more categories of the item, description of the item, price, etc.

The data storage device 124 can include one or more different types of data storage devices, such as, for example, one or more rotating disks drives, one or more solid state drives (SSDs), and/or any other type of data storage device. The data storage device 124 in some non-limiting examples includes a redundant array of independent disks (RAID) array. In some non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device. In other embodiments, the data storage device 124 includes a database, such as, but not limited to, the database 600 in FIG. 6.

The data storage device 124 in this example is included within the computing device 102, attached to the computing device, plugged into the computing device, or otherwise associated with the computing device 102. In other embodiments, the data storage device 124 includes a remote data storage accessed by the computing device via the network 112, such as a remote data storage device, a data storage in a remote data center, or a cloud storage.

The memory 108, in some embodiments, stores one or more computer-executable components, such as the filter manager 140. In this example, the filter manager 140 obtains a plurality of candidate items associated with a recognized location within a retail facility from the set of recognition models 122. Each candidate item in the plurality of candidate items is an item recognized using an image of the candidate item and/or an image of the item's current location captured by the image capture device(s) 116. The filter manager 140 includes a local level filter 142 that performs a global level filtering on the plurality of candidate items to remove/filter any candidate items associated with an item category that is unconfirmed for the recognized location using the location-to-category mapping table 126 to identify confirmed categories of items which are expected to be found at the current location.

A local level filter 144 performs a local level filtering on the plurality of candidate items removing low count items which are included in confirmed categories for the location, but which may still be a misplaced item or other false positive for the current location. The filter manager 140 in some embodiments generates the item-to-location mapping result(s) 134 including a mapping of each candidate item remaining within the plurality of candidate items to the recognized location following completion of the global level filtering and the local level filtering. The item-to-location mapping result(s) 134 are presented to a user via a user interface device for more accurate identification of item locations within the retail facility, such as, but not limited to, the user interface device 110. However, in other embodiments, the item-to-location mapping result(s) 134 are presented to a user via a user interface device on a user device (not shown) associated with the user. In this example, the item-to-location mapping results are transmitted to the user device via the network 112.

The filtered item-to-location mapping results are used for pallet management, inventory management, locating pallets and other items in the retail environment more quickly and efficiently, restocking, identifying void (empty) areas on bins and other storage areas available for temporary placement of pallets on the sales floor, etc. The filtered item-to-location mapping results are updated dynamically using image data 120 which is continually being generated by the image capture device(s) 116. This enables the item-to-location mapping data 128 to be kept up-to-date and as accurate as possible, further enabling users to quickly locate pallets and other needed items while reducing user time spent searching for items which were erroneously mapped to an incorrect location as a result of a false positive item and/or location recognition.

In some embodiments, the system 100 is a system for automatically recognizing items and locations using image data 120. The set of recognition models 122 leverages location tags at a location, such as a bin, to determine the location of the items detected using the image data captured by the image capture device(s) 116. The set of recognition models 122 performs item product recognition using a price tag model that uses price tags present at the bins or other areas within the retail environment to recognize the items. A KWFV model uses text and visual features of items to recognize the items and generate item category to bin location mappings. The item category to location mappings is validated using historical data. The system generates global and local category-based post-processing logics to gather the correct locations of items within the retail facility (in-store) and recognize false positive predictions.

The system, in some embodiments, includes global category logic that checks whether categories of recognized items confirm with recognized locations. The filter manager removes predictions which do not have the current recognized location in their possible locations. The local category logic associated with the local level filter uses counts of items at each location to identify incorrect predictions. The local level filter 142 determines which category items are in abundance or minority basis category to universal product number (UPC) count mappings. The local level filter 142 removes the category items that have low UPC count (odd one out categories).

In this manner, the filter manager performs post-processing steps which are used to reduce false positives associated with the price tag model and KWFV model and can complement the IRAS models for improved item-to-location (bin level) mapping metrics providing better product to in-store location mapping. The category logic (global and local) are post-processing steps which leverage categories and item counts of the recognized items at the recognized location of the item storage structure to gather the correct locations of items within the club (in-store) and recognize false positive predictions.

The global category logic ensures that each category and their sub-category level predictions are only occurring at confirmed locations. It removes the predictions which do not have the current recognized location in their possible locations. Global category logic associated with the global level filter 144 checks whether categories of recognized items conform with recognized locations and remove predictions which do not have the current recognized location in their possible locations. The system removes the category items that have low UPC count (odd one out categories). The system analyzes images of items in a store and identifies those items and item locations using image recognition. The system filters out/removes items which are not identified in a location assigned to the item category.

FIG. 2 is an exemplary block diagram illustrating a system for item-to-location mapping based on image data generated by one or more robotic image capture devices associated with a retail facility 200. The retail facility is a retail establishment, such as a department store, grocery store, big box store, warehouse, distribution center, or any other facility associated with storing and/or displaying a plurality of items. The retail facility 200 can include an indoor area, an outdoor area, or a combination of indoor and outdoor areas for displaying and/or storing items. The retail facility can be subdivided into sections, departments, or other areas for storing and/or displaying different categories of items. For example, a retail facility can include a grocery section for storing/displaying food items and a pet supplies department for storing and/or displaying pet supplies.

The plurality of items 202 in some embodiments are presented, displayed, or otherwise stored in an item storage structure 204. The item storage structure 204 includes a bin, shelf, rack, tote, pallet, display case, or any other type of display. A bin includes a storage or reserve area having one or more vertical steel bars and/or one or more horizontal steel bars configured to store or secure one or more pallets of items. A display case includes a temperature-controlled display case or a non-temperature controlled display case. A temperature-controlled display case includes a refrigerated display case, a freezer display, a warm display area having one or more heat lamps or other sources of heat, etc. A display case optionally includes a door. Each item storage structure 204 includes a location tag 206 associated with the item storage structure. The location tag 206 includes a location ID. The location tag is secured on or near the item storage structure 204. The system identifies the current location of an item on, in or under the item storage structure 204 using the location tag 206.

In some embodiments, one or more image capture device(s) 116 are mounted to one or more robotic devices 208 which move through the retail facility generating one or more image(s) 210 of one or more items in the plurality of items 202 on the item storage structure 204 or a portion of the item storage structure 204. In one example, the robotic device 208 moves around the retail facility 200 gathering raw images of the plurality of items 202 on one or more item storage structures which input into one or more object detection models and/or recognition models for object detection and recognition. The plurality of items 202 which are detected and recognized at one or more recognized locations are provided as input to the filter manager for global and local category-based items and location recognition filtering.

The plurality of items 202 includes items on a portion of the item storage structure, items placed beneath a portion of the item storage structure, items placed within the item storage structure, and/or items placed adjacent to the item storage structure. An item in the plurality of items 202 can include a single, individual item as well as multiple items packed together in a single pallet.

The image(s) 210 captured by the image capture device(s) 116 are transmitted to the cloud server 118 via the network. However, in other embodiments, the image(s) are transmitted to a computing device, such as, but not limited to, the computing device 102 in FIG. 2. In still other embodiments, the image(s) are transmitted to a data storage device and/or a cloud storage until the image(s) are pulled or otherwise retrieved by the recognition model(s). Thus, the image data, including the image(s) 210 may be pushed to the recognition model(s) periodically or the image(s) may be pulled from the image capture device(s) or from a data storage device when required by the recognition models or at the occurrence of a predetermined event, such as a predetermined time.

Figure 3:
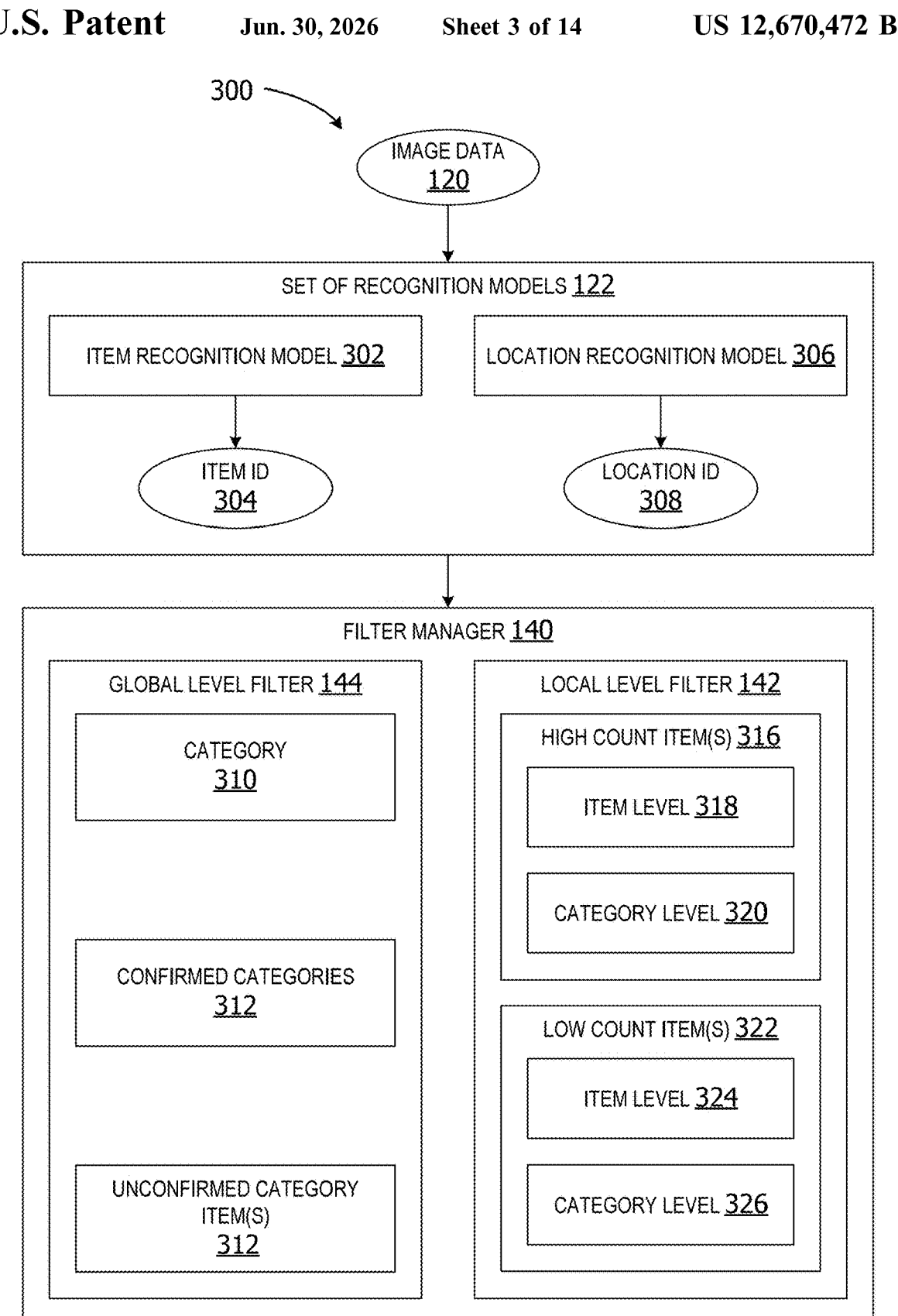
FIG. 3 is an exemplary block diagram illustrating a system for category-based item-location mapping using global and local level filtering.

Turning now to FIG. 3, an exemplary block diagram illustrating a system 300 for category-based item-location mapping using global and local level filtering is shown. In the example shown in FIG. 3, image data 120 is obtained by the set of recognition models 122. The set of recognition models 122 includes an item recognition model 302 which analyzes the image data 120 to identify one or more candidate items. Each identified candidate item is associated with an item ID 304.

A location recognition model 306 analyzes the image data 120 to identify the current location in which the image capture device generated the image data 120. More specifically, the location recognition model 306 recognizes a location tag associated with the current location of the image capture device. The location tag includes a location ID 308 used to identify the location.

The filter manager 140 obtains the item recognition data and the location recognition data, including the item ID 304 for each candidate item and the location ID 308 for the recognized location of the candidate items. A global level filter 144 identifies a category 310 of each candidate item using an item-to-category mapping. The global level filter 144 identifies one or more confirmed categories 312 for the current location using a location-to-category mapping table, such as, but not limited to, the location-to-category mapping table 1200 in FIG. 12. The global level filter 144 identifies a set of unconfirmed category item(s) 314 to be removed from the candidate items. An unconfirmed category item is an item associated with a category that is not one of the confirmed categories 312 for the location ID 308.

The local level filter 142 identifies high count item(s) 316 at an item level 318 and/or at a category level 320. Item level 318 high count item(s) 316 are items in which each individual type of item has an item count number that is greater than a threshold value. A high count item is an item that is present in a majority at the current location. The threshold value is a configurable value. In some embodiments, the threshold value is a threshold of one instance of the item. In another example, the threshold is a value of two instances of a given item. In other embodiments, the threshold is three instances of the item. The local level filter 142 removes candidate items associated with a low count value at the item-level (item-level low count) where the number of instances of the item falls below a majority threshold associated with the recognized location.

The majority threshold is an item-level threshold for determining whether an item is a low-count item having a minority presence at the recognized location or a high-count item representing a majority of items at the recognized location or a portion of the recognized location, such as a cluster of items on a shelf, bin, display case or other item storage structure. The majority threshold can be a single threshold applied to all items in the retail facility or the majority threshold can be a location-specific or item-specific threshold which is customized for a particular location (area, bin, department, etc.) or customized for a particular item. All items having an item count that is equal to or exceeds the majority threshold are identified in a set of high count item(s) 316. The set of high count item(s) can be a null set (no high-count items), a set having a single item, or a set having two or more high count items for the location at the item level.

If the set of high count item(s) 316 at the item level 318 is a null set (no candidate item is found to be a high count item), the local level filter identifies a set of high count item(s) at a category level. The local level filter identifies all items in the same category and then calculates the count value for all instances of all items in the same category. The category level count value indicates the number of instances of all types of items in the same category present in the same location.

The local level filter 142 identifies low count item(s) 322 at an item level 324 and/or at a category-level 326. For example, if there is one instances of a first variety of a box of snack size chips and another instance of a second variety of a box of snack size chips and another instance of a third variety of a box of snack size chips, then the count value for each different variety of chips is only one instance. This does not exceed the item-level majority threshold. The high count item level threshold may also be referred to as an item level high count threshold at the item-level.

In this example, when all the varieties of chips are aggregated together at a category level, the count value for the category of snack size chips is three rather than one. The boxes of snack size chips are then a high count category, and all three varieties of the snack size chips are included in the set of high count item(s) 316. If a box of paper plates is identified in the cluster of snack size chips, the paper plate box is a low count item because the item count is below the threshold and the paper plate box is the only instance of paper plates for that paper products category. Therefore, the local level filter 142 removes the paper plates item from the plurality of candidate items.

In some embodiments, the filter manager includes category logic (global and local) that leverages categories and counts of the recognized items at the location bin. A category can be assigned to multiple locations in the store. A location can include multiple categories. For a given bin, global category logic checks whether categories of recognized products conform with the recognized location. It uses a category-to-location mapping as ground truth which contains information about what store location should contain which category items. Ground truth information is gathered from store operations data and validated using historical time series predictions. Each category can have multiple sub-categories. Global category logic ensures each category and sub-category level predictions should only be occurring at confirmed locations and removes the predictions which do not have the current recognized location in their possible locations. This improves bin-level metrics and establishes more accurate mapping of products to store locations.

Local category logic considers categories that are appropriate per the current location which were not filtered by the global logic. Local category logic uses counts of items at each bin to identify incorrect predictions and determine which category products are in abundance or in the minority based on item count at a given location. Local category logic checks for the odd-one-out subcategory predictions among abundant category predictions.

A category to high count UPC mapping is constructed, in some embodiments, which represents what all category items recognized in abundance at a current location. Similarly, a category to low count UPC mapping is also created to represent all the category products which are in the minority at this location. Any category which is not present in category to high count UPC mapping and only present in the category to low count UPC mapping, is regarded as an odd-one-out category. The items of this category are removed from the published results.

There are cases where none of the predicted UPCs are present in high count. These are handled in local category logic by considering the count threshold at category level instead of applying at the UPC level. The system leverages categories and counts of recognized products at the location bin. For a given bin location, local category logic checks for the odd-one-out sub-category predictions among abundant category predictions. Local category logic only considers the categories which are appropriate as per the current location and were not removed by global category logic filter. Wherever these misrecognized products category does not confirm with current bin location, global category logic triggers. If they are of a sub-category and pass the global category logic without being removed, local category logic handles the item detection if it is in low count. The filter manager category logic applies low confidence price tag recognitions to have minimal impact on coverage of products while still removing false positives. Global and local category logic are highly effective at removing false positives by recognition models including price tag model and KWFV models, removing reserve area recognitions and item in cart recognitions.

Figure 4:
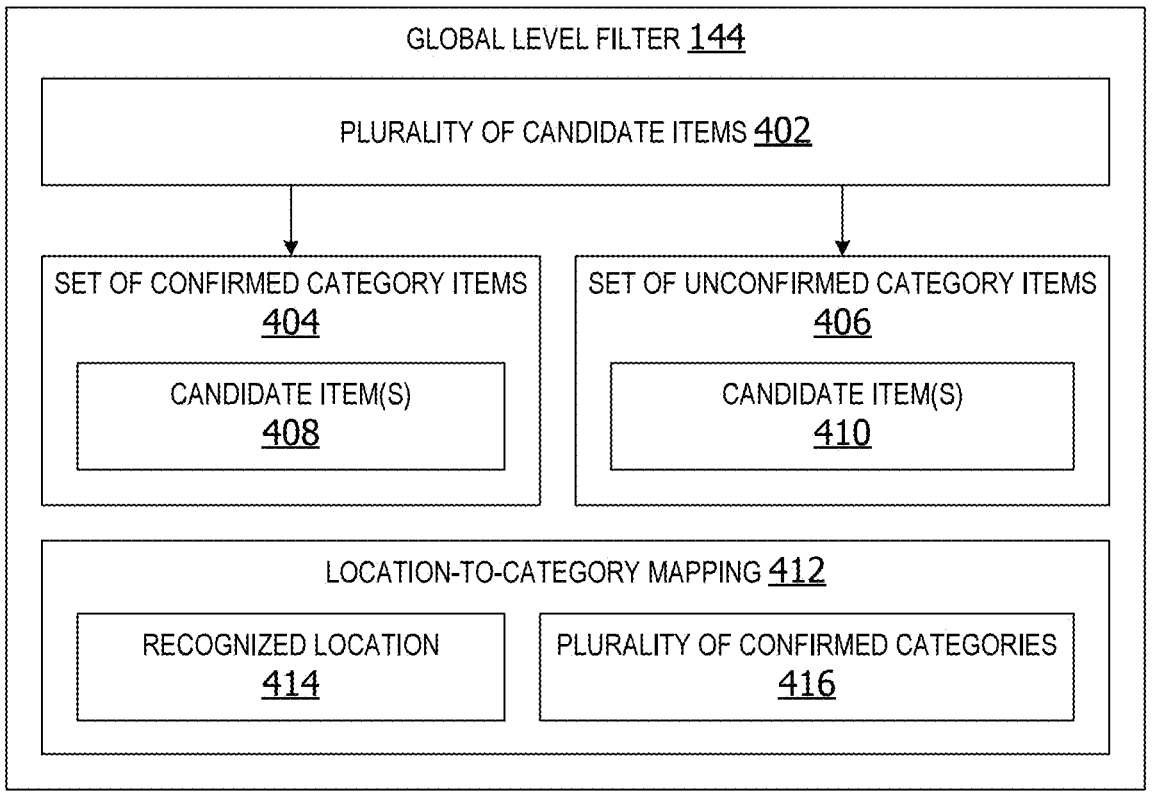
FIG. 4 is an exemplary block diagram illustrating a global level filter performing category-based filtering of item-location recognition data.

FIG. 4 is an exemplary block diagram illustrating a global level filter 144 performing category-based filtering of item-location recognition data. The global level filter 144 analyzes a plurality of candidate items 402 to identify a set of confirmed category items 404. The set of confirmed category items 404 includes a set of one or more candidate item(s) 408 having a category that matches a confirmed category for a given location. The global level filter 144 also identifies a set of unconfirmed category items 406 from the plurality of candidate items 402. The set of unconfirmed category items 406 includes a set of one or more candidate item(s) 410 having a category that fails to match a confirmed category in the plurality of confirmed categories 416 for a recognized location. The global level filter 144 identifies the plurality of confirmed categories 416 using a location-to-category mapping 412 associated with the recognized (current) location 414.

The global level filter 144 removes the set of unconfirmed category items 406 from the plurality of candidate items

402. The remaining set of confirmed category items 404 remain in the plurality of candidate items 402 and are subjected to local level filtering by the local level filter.

Figure 5:
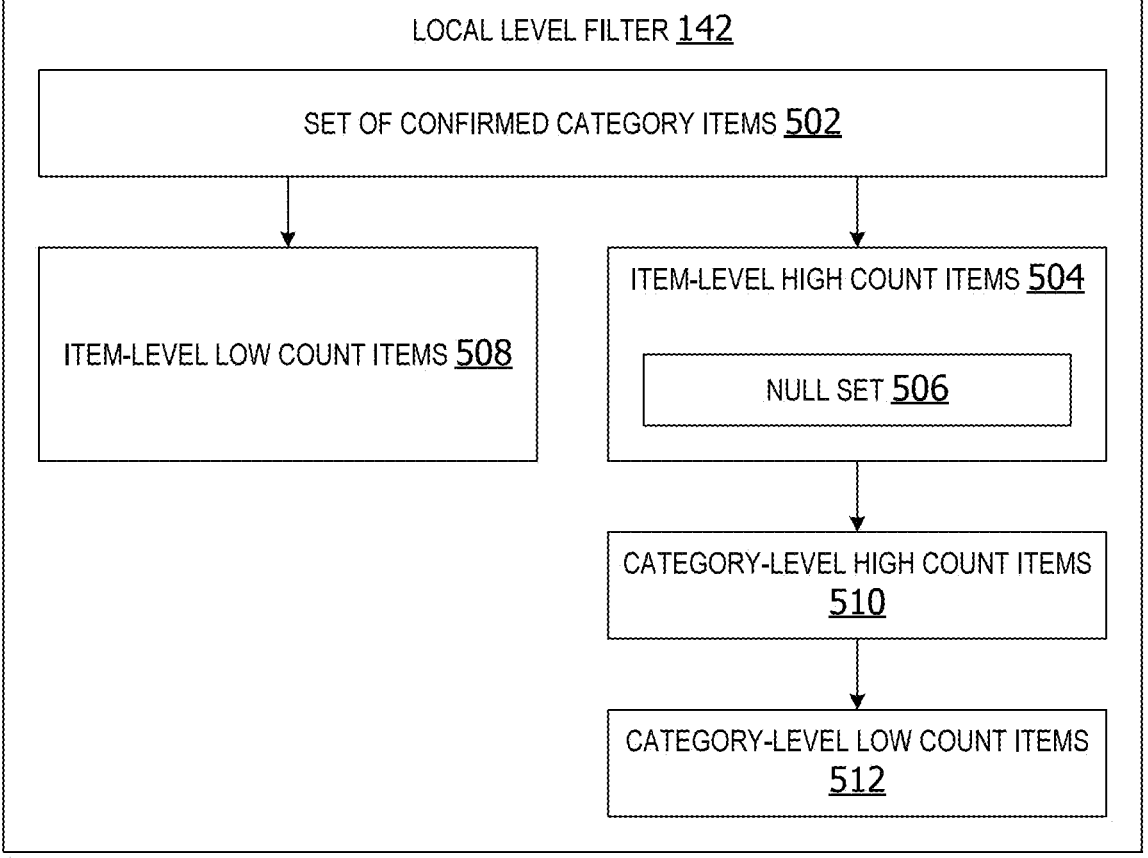
FIG. 5 is an exemplary block diagram illustrating a local level filter performing item-level and category-level low count item filtering of item-location recognition data.

FIG. 5 is an exemplary block diagram illustrating a local level filter 142 performing item-level and category-level low count item filtering of item-location recognition data. The local level filter 142 in this example identifies a set of item-level high count items 504 and a set of item-level low count items 508 from the set of confirmed category items 502. The set of item-level low count items 508 are removed from the candidate items remaining in the set of confirmed category items 502.

If the item-level high count items 504 are a null set 506 (no item-level high count items), the local level filter generates a set of category-level high count items 510 for each category associated with the candidate items remaining in the set of confirmed category items having a count value that is equal to or exceeds the majority threshold value. The local level filter 142 identifies any category-level low count items 512. Any category-level low count items 512 are removed from the set of confirmed category items 502.

Figure 6:
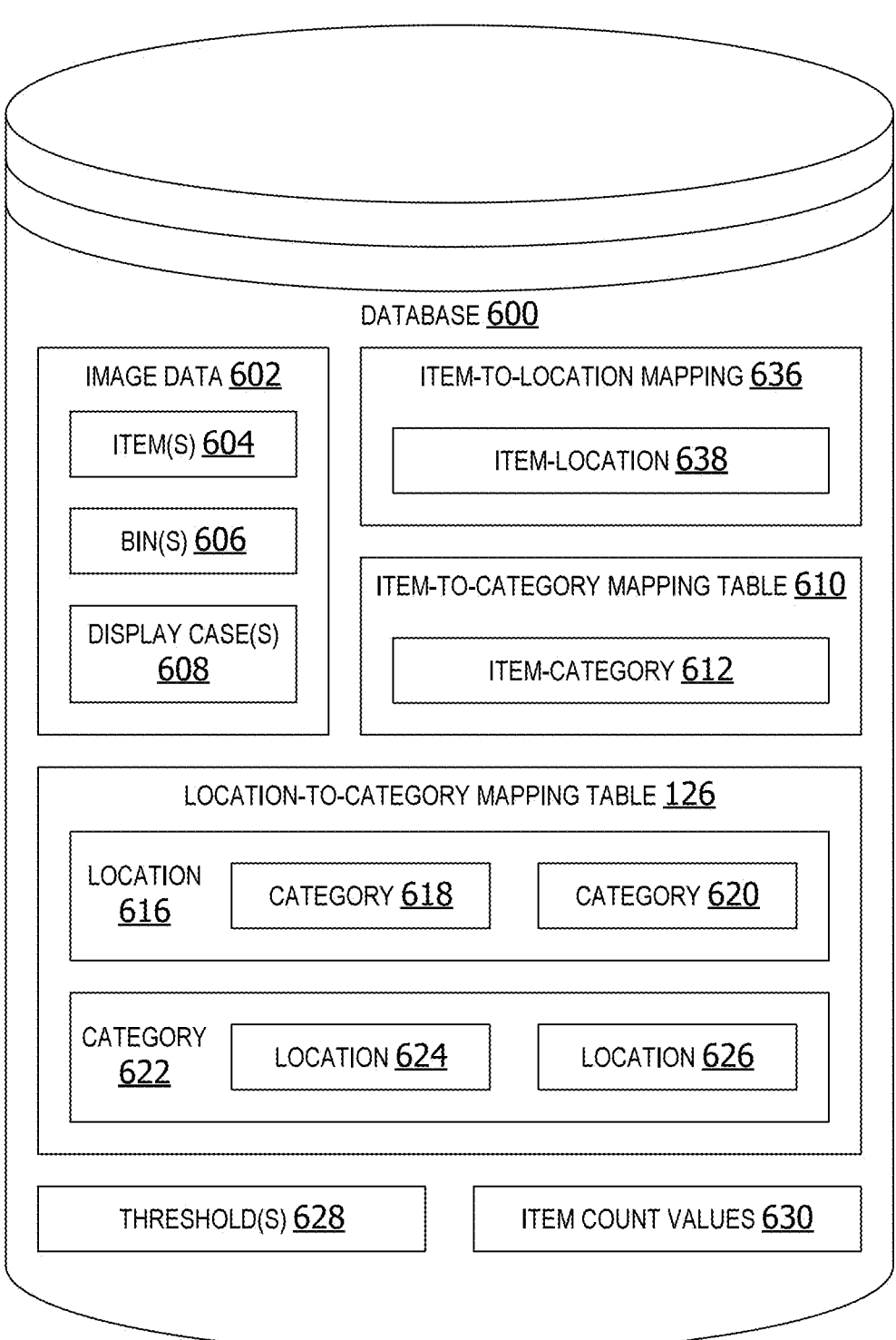
FIG. 6 is an exemplary block diagram illustrating a database storing data associated with performing category-based filtering of item-location recognition data.

FIG. 6 is an exemplary block diagram illustrating a database 600 storing data associated with performing category-based filtering of item-location recognition data. The database 600 includes data such as, but not limited to, image data 602 generated by one or more image capture devices, such as the image capture device(s) 116 in FIG. 1. The image data 602 includes one or more images of one or more item(s) 604 associated with one or more item storage structures, such as one or more bin(s) 606 and/or one or more display case(s) 608.

The database 600 optionally also includes an item-to-category mapping table 610 including a one-to-one item-category 612 pairing for each item in a plurality of items. The filter manager uses the item-to-category mapping table 610 to identify a category of each candidate item in the plurality of candidate items being filtered to remove false positives.

A location-to-category mapping table 126 may also be stored on the database 600. The location-to-category mapping table 126 maps a location 616 to one or more categories confirmed for the location 616. In this example, the location 616 maps to a first category 618 and a second category 620. However, the embodiments are not limited to mapping a location to two categories. A location can map to a single confirmed category as well as three or more confirmed categories. Each category 622 can also be mapped to one or more locations. In this example, the category 622 includes a first confirmed location 624 and a second confirmed location 626. However, the embodiments are not limited to two locations. In other embodiments, a single category can be mapped to a single confirmed location as well as three or more confirmed locations.

The database 600 optionally includes one or more threshold(s) 628, such as but not limited to, a minority item threshold (low count threshold) and/or a majority threshold (high count threshold). The database 600 also optionally includes one or more item count values 630. An item count value is a number of instances of an item within a recognized location at an item level. At a category level, the item count value is the number of instances of each type of item of the same category identified within a recognized location.

The item-to-location mapping 636 is a mapping of each candidate item which remains after the global level filtering and the local level filtering. In other words, the recognition model(s) generate a plurality of candidate item recognitions. The candidate items may include false positives. The global level filtering and local level filtering are applied to the plurality of candidate items to remove potential false positive item recognitions associated with the current location (recognized location). Any candidate items remaining after filtering at the global and local level is complete are mapped to the current location as an item-location 638 pair in the item-to-location mapping 636. In this manner, the item-to-location mapping 636 has fewer false positives or potentially no false positives remaining in the item-to-location mapping results.

Figure 7:
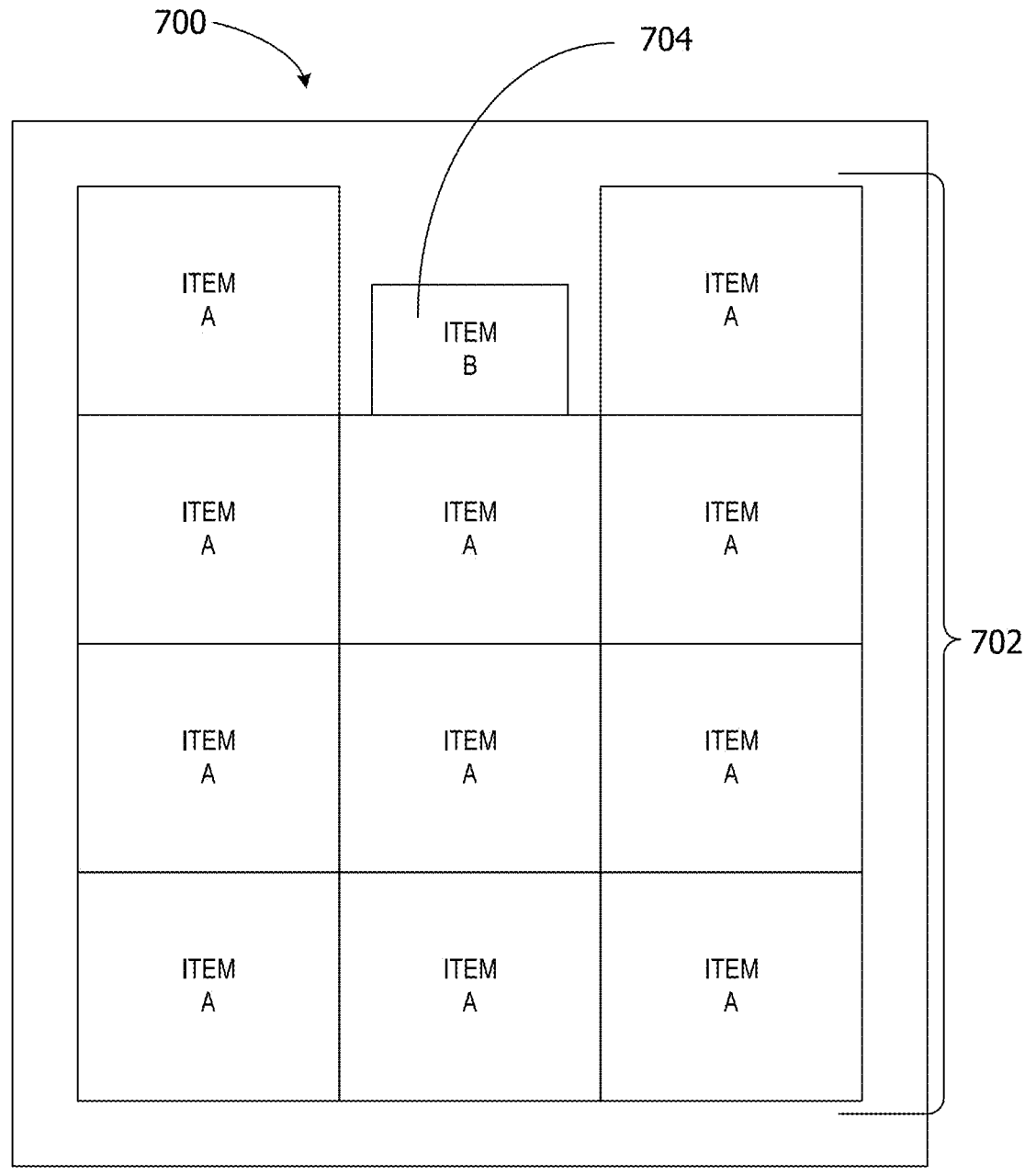
FIG. 7 is an exemplary block diagram illustrating a plurality of candidate items at a recognized location within a retail facility.

Referring now to FIG. 7, an exemplary block diagram illustrating a plurality of candidate items 700 at a recognized location within a retail facility is shown. In this example, eleven instances of an item A 702 are present within the recognized location. A single instance of item B 704 is present within the plurality of candidate items 700 at the recognized location. If the item B is an unconfirmed category for the location, the global level filter removes the item B 704 from the list of recognized items which are candidates for use in the item-to-location mapping results.

However, if the item B 704 is within a confirmed category for the location, the global level filter does not remove the item B. In this case, the local level filter identifies the item A as a majority high count item at the item level. The item B is a low count item because only a single instance of the item B is present. The local level filter removes the item B from the candidate items.

Figure 8:
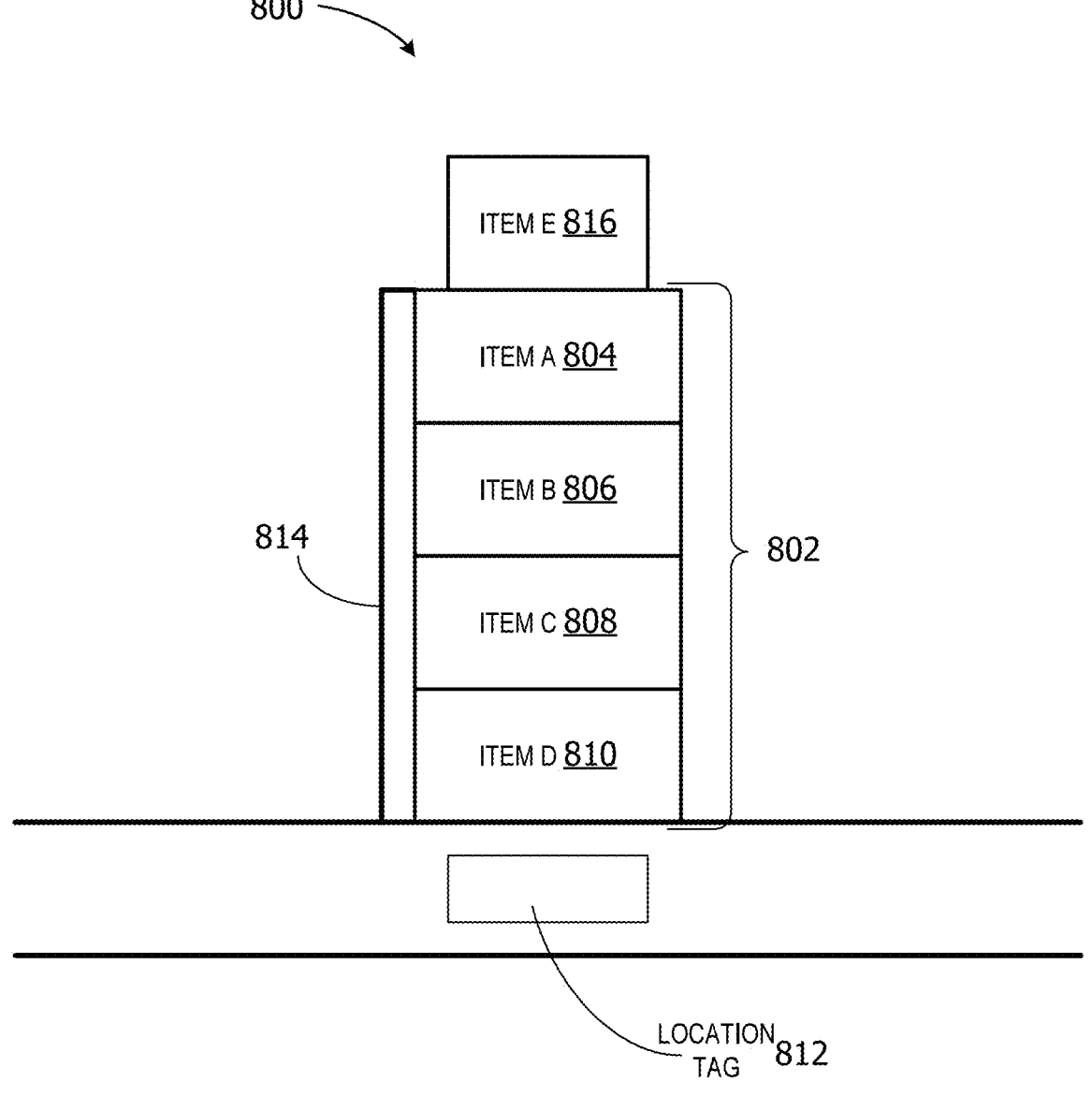
FIG. 8 is an exemplary block diagram illustrating a plurality of low count items at a recognized location within a retail facility.

FIG. 8 is an exemplary block diagram illustrating a plurality of low count items 802 at a recognized location 814 within a portion of a facility 800. The portion of the retail facility 800 be an indoor area, an outdoor area or an area which is partially enclosed, such as a garden center or enclosed patio area. The plurality of low count items 802 includes item A 804, item B 806, item C 808 and item D 810. A location tag 812 is used to identify the location 814. All the items in the plurality of low count items 802 are associated with the same category in this example. The category is a confirmed category for the location 814, therefore, the global level filter fails to filter any of the items. The local level filter identifies all the items as a low count item because none of the items have an item count that exceeds the low count threshold or is less than a high count threshold (majority threshold). The set of item level high count items in this example is a null set. The local level filter aggregates the instances of all the items together to obtain a category level count value of four associated with the four items of the same category. The count value of four places item A 804, item B 806, item C 808 and item D 810 in the set of category level high count items.

In this example, item E 816 is an item in a different category. The item has a single count value at both the item level and at the category level. Therefore, the local level filter identifies the item E 816 as a low count item and filters the item E from the item-to-location mapping results.

Figure 9:
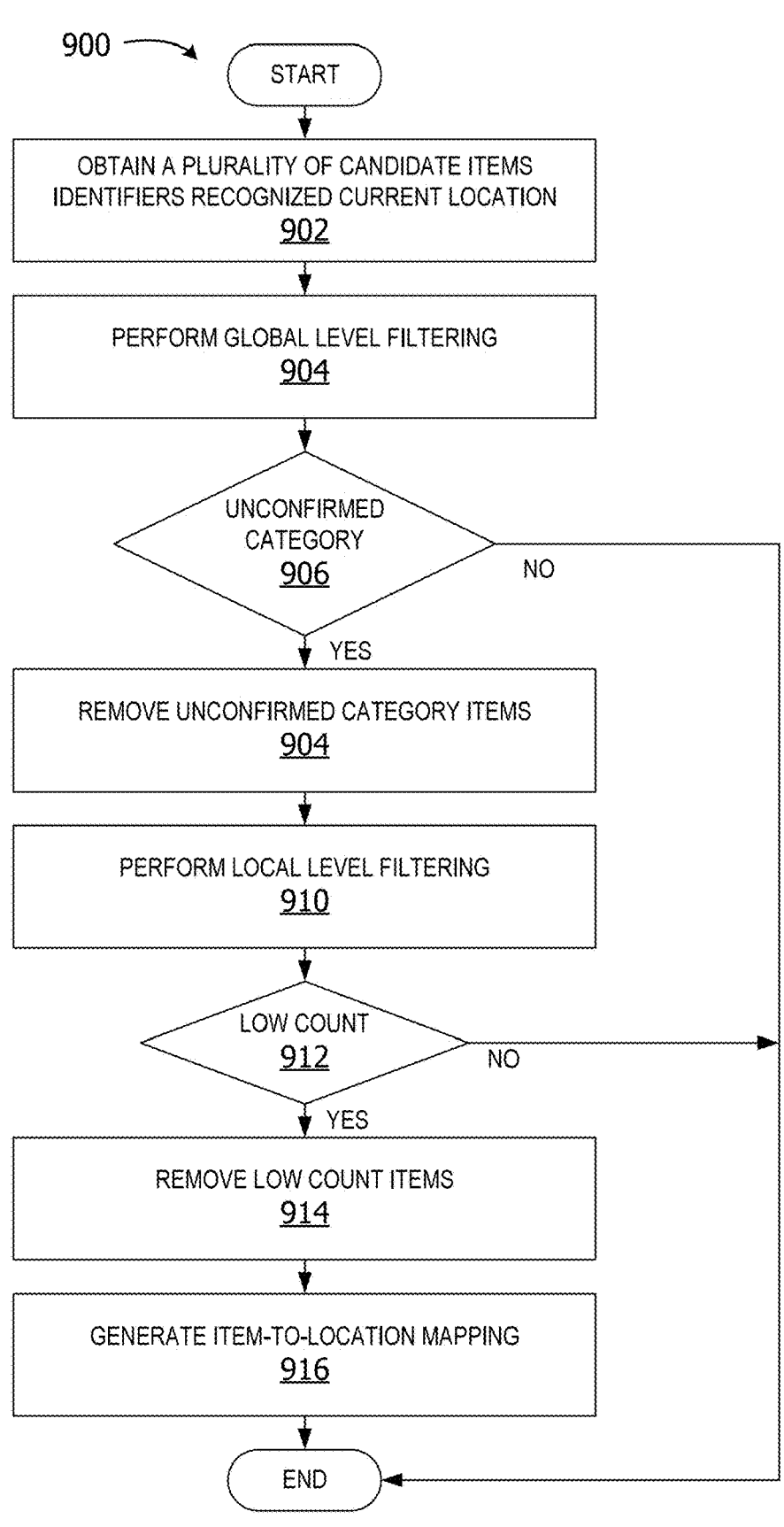
FIG. 9 is an exemplary flow chart illustrating operation of the computing device to generate item-to-location mapping using category-based global and local filtering.

FIG. 9 is an exemplary flow chart 900 illustrating operation of the computing device to generate item-to-location mapping using category-based global and local filtering. The process shown in FIG. 9 is performed by a filter manager component, executing on a computing device, such as the computing device 102 or the user device 116 in FIG. 1.

The process begins by obtaining a plurality of candidate item identifiers associated with a plurality of candidate items recognized at a current location at 902. A filter manager performs global level filtering at 904. A determination is made whether any of the recognized items are associated with an unconfirmed category for the current location at 906. If yes, the filter manager removes the unconfirmed category items from the plurality of candidate items at 908. The filter manager performs local level filtering at 910. A determination is made whether any candidate item is a low count item at the current location at 912. If yes, the filter manager removes the low count items from the plurality of candidate items at 914. The filter manager generates an item-to-location mapping using the remaining unfiltered items in the plurality of candidate items at 916. The process terminates thereafter.

While the operations illustrated in FIG. 9 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 9.

Figure 10:
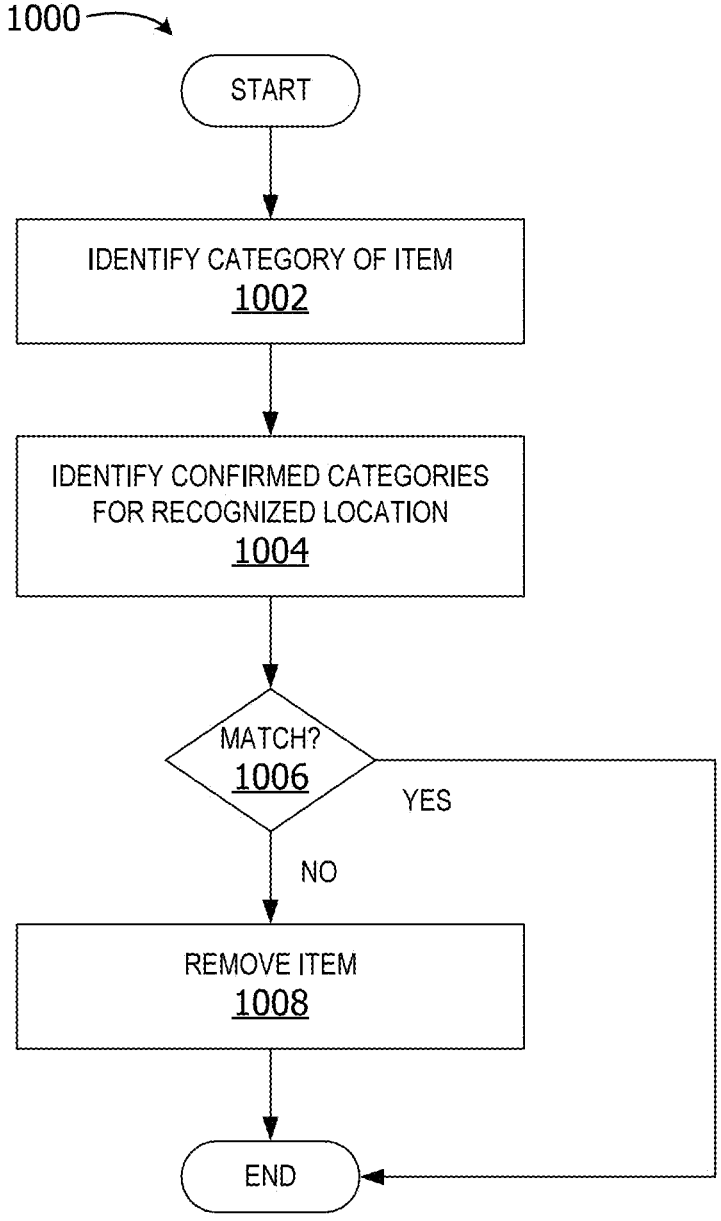
FIG. 10 is an exemplary flow chart illustrating operation of the computing device to perform global level filtering.

FIG. 10 is an exemplary flow chart 1000 illustrating operation of the computing device to perform global level filtering. The process shown in FIG. 10 is performed by a filter manager component, executing on a computing device, such as the computing device 102 or the user device 116 in FIG. 1.

The process begins by identifying a category of a candidate item at 1002. The global level filter identifies one or more confirmed categories for a recognized location at 1004. A determination is made whether a category associated with a candidate item matches a confirmed category of the recognized category at 1006. This is accomplished by comparing each candidate item category with the confirmed categories for each location using a location-to-category mapping table. If not, the local level filter removes the item from the plurality of candidate items at 1008. The process terminates thereafter.

While the operations illustrated in FIG. 10 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 10.

Figure 11:
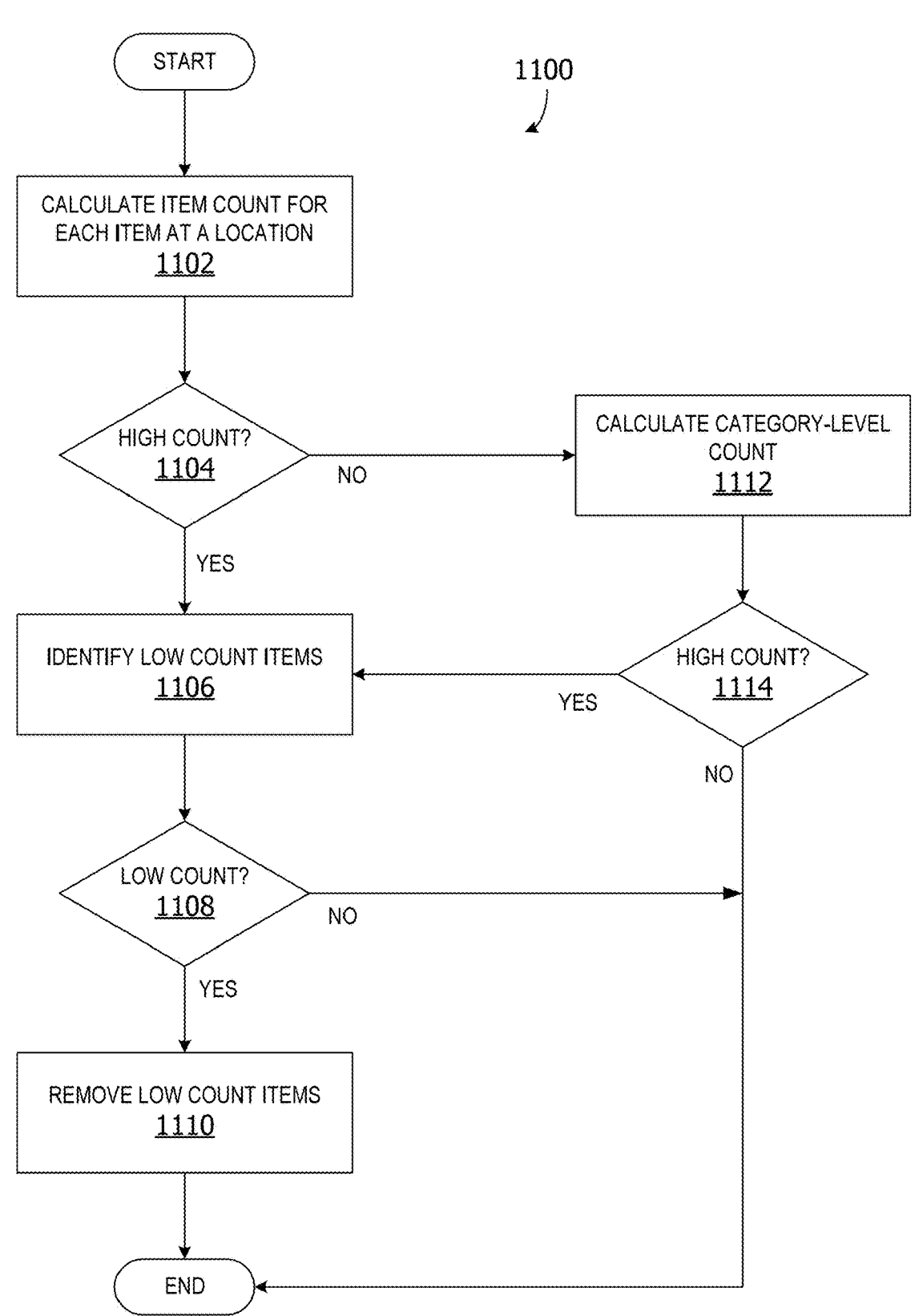
FIG. 11 is an exemplary flow chart illustrating operation of the computing device to perform local level filtering.

FIG. 11 is an exemplary flow chart 1100 illustrating operation of the computing device to perform local level filtering. The process shown in FIG. 11 is performed by a filter manager component, executing on a computing device, such as the computing device 102 or the user device 116 in FIG. 1.

The process begins by calculating an item count for each candidate item at a location at 1102. The local level filter determines if the candidate item is a high count item based on the item count at 1104. If yes, the local level filter identifies low count items at an item level at 1106. A determination is made whether a low count item is found at 1108. If yes, the one or more low count candidate items are removed from the plurality of candidate items at 1110.

Returning to 1104, if a high count candidate item is not found, the local level filter calculates a category-level count at 1112. A determination is made whether the candidate item is a high count item based on the category-level item count at 1114. If yes, the local level filter identifies low count items using the category-level item counts at 1106. If a category-level low count candidate item is found at 1108, the local level filter removes the low count candidate item from the plurality of candidate items at 1110. The process terminates thereafter.

While the operations illustrated in FIG. 11 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 11.

Figure 12:
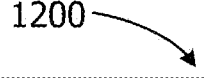
FIG. 12 is an exemplary location-to-category mapping table.

Turning now to FIG. 12, an exemplary location-to-category mapping table 1200 is shown. The location-to-category mapping table 1200 is an exemplary table including a mapping of each location in a retail facility to one or more confirmed categories for each location. Each location is a section, department, or area within a retail facility. A location can include a grocery department, a toy department, a pet supplies department, a pharmacy, etc. Each location maps to at least one category of items. For example, a grocery (G) location maps to coffee, breakfast foods, oils, rice, etc. In another example, an electronics (E) department maps to televisions, soundbars, appliances, etc.

In the example shown in FIG. 12, six locations are mapped to one or more categories. However, the embodiments are not limited to a location-to-category table that includes six locations. In other embodiments, the location-to-category table includes one or more locations. For example, the location-to-category table can include dozens of locations or hundreds of locations within a retail facility.

A category can be present at multiple locations in a retail facility. Wine category can be present in central as well as in grocery section. A location can contain multiple categories together. For example, a central area can contain candy, toys, wine etc.

Figure 13:
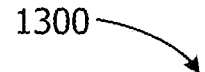
FIG. 13 is an exemplary category-to-location mapping table.

FIG. 13 is an exemplary category-to-location mapping table 1300. The category-to-location mapping table 1300 includes a category identifier, a category description, and locations (zones) where items in each category can be located (confirmed locations). In the example shown in FIG. 13, the category-to-location mapping table 1300 includes three categories. However, the embodiments are not limited to three categories in a category-to-location mapping table. In other embodiments, the category-to-location mapping table includes two categories, as well as four or more categories mapped to confirmed locations.

In some embodiments, the category to location mapping is constructed by gathering store operations data and then validating it with historical time series predictions. For example, a category 11 of home improvement type should only occur at hardline (H) and grocery (G) section which is also confirmed by historical results.

Each Category can have multiple sub-categories. For example, a home improvement category can include air purification, LED light bulbs, kitchen, and bathroom accessories, and/or water softeners as sub-categories. Global category logic ensures that each category and their sub-category level predictions should only be occurring at confirmed locations and removes the predictions which do not have the current recognized location in their possible locations. For example, a moisturizing cream having the category of health and beauty could not be located in a prepared foods section because the possible location for prepared foods includes FM and the possible locations for health and beauty products includes locations W, G & C.

In the example shown in FIG. 12 and FIG. 13, the location-to-category mapping table and the category-to-location mapping table are separate tables. However, in other embodiments, a location-to-category mapping table includes both the location-to-category mappings as well as the category-to-location mappings in a single table.

FIG. 14 is an exemplary location-to-item mapping result 1400. The location-to-item mapping result 1400 includes an identifier for each item and a current location of each item in the retail location. In the example shown in FIG. 14, the item-to-location mapping result 1400 includes four items mapped to their current locations. However, in other embodiments, the item-to-location mapping result includes any number of items. For example, the item-to-location mapping result can include a single item, two items, three items, as well as five or more items. The items shown in the item-to-location mapping result are items that remained unfiltered from the plurality of candidate items recognized by a recognition model based on image data associated with the current location of each item after both global level filtering and local level filtering of the candidate items.

Additional Examples

In some embodiments, raw images from mobile robotic device having an image capture device are processed by one or more detection models to try to recognize all objects from the raw images, like products, price tags, location tags, steel bars, pallet tags, pallets, etc. The robotic device roams around the store taking images of items located on shelves, bins, display cases, etc. The system extracts objects from the images. Detection models detect all possible objects and/or entities. The item recognition models analyze the images to recognize items, such as by recognizing the item universal product code (UPC) or another item ID.

In some embodiment, bin level metrics are applied to assess accuracy of the item-to-location mapping. The metrics include zero bin tolerance and one bin tolerance. Zero bin tolerance metrics permit item recognition and mapping to the correct location (bin) only. One bin tolerance permits item recognition and mapping to the correct location or an adjacent location, such as where the item-to-location mapping is one bin off mapping the item to an adjacent bin.

The global level filtering and local level filtering are used to remove false positives associated with recognized items associated with an incorrect location due to recognition of misplaced items, recognition of items in a customer shopping cart, incorrect recognition of an item, etc. The filtering reduces erroneous item-to-location mapping for more accurate and reliable results.

In an example scenario, the system recognizes an item image displayed on a television or computer screen within an electronics section of the retail facility, such as with a commercial playing on the television. If the item on the screen is a jar of moisturizer, the item recognition of a moisturizer product in the electronic section is a false positive. If the recognized item displayed on the television screen is mapped to the electronics department, that item-to-location mapping would be an erroneous mapping. However, the global level filtering removes the moisturizer from the recognition results for the electronics section because the category for moisturizer (health and beauty) does not match confirmed categories for the electronics section, which includes categories such as, but not limited to, television, computer, video games, etc.

In another example scenario, the robotic device captures a series of images of items in a bakery section, such as loaves of bread. However, if a package of donuts is also recognized among the loaves of bread, the global level filter does not remove the item because the donuts are in the same bakery category as the loaves of bread. However, the local level filter identifies the package of donuts as a low count item and removes the package of donuts from the results for the area having majority loaves of bread. Thus, the local level filter enables filtering of misplaced items mingled with other similar items where a majority of items are from a single category, the minority category item can be assumed to be a false positive. Any item of a minority category (low count item) relative to the majority category is removed.

If there are not very many of any single type of item, the system checks for a majority category of items across all types of items at the location (bin or display case) instead of based on the count of single type of item. If the individual items have a count of only one or two instances of each item type, there is no majority cluster of identical items. In this case, the system calculates a category-level count for all items in the majority category. The aggregate count at category level is used to identify items in the minority category and remove false positives based on the minority category.

In one example, the system identifies an item in an image and identifies the location of the item in the image. The filter manager identifies a category of the item in the image and determines if the item location matches a possible location for the item category. If the location of the item does not match a possible location for the item category, the item is filtered/removed from the image detection results.

In another example, if a hair care product is identified in an electronics section of a store, the system removes that item and item location from the results because the category of hair care products should only be located in a pharmacy or personal hygiene sections of the store. Because the item is not identified in a possible location for the item's category, the item is removed from the results. This provides auto-identification of confident exceptions, like false positive model predictions, club operation errors. For example, misplaced items, customer cart item predictions, item no location tag placement, multi-order image level and UPC Level intelligent aggregation of signals like category, count etc. for removal of identified false positives.

In an example scenario in a grocery section of a store, a bottle of ketchup is in the grocery category. Cereal is also included in the same grocery category for the store. If the system identifies a bottle of ketchup on the cereal aisle, the global level filter 144 does not filter out the ketchup bottle from the item recognition results for the cereal aisle location because the grocery category associated with the ketchup is a confirmed category for the cereal aisle recognized location. In this case, it is likely that the ketchup bottle is a misplaced item, item recognized in a customer cart or other false positive as ketchup is not typically stocked on the cereal aisle. The local level filter 142 determines that the number of instances of the ketchup (one bottle) is a minority item in a low item count cluster of majority cereal items. Therefore, the local level filter 142 removes the ketchup item from the plurality of candidate items recognized on the cereal aisle.

In yet another example scenario, if the system recognizes two boxes of corn flakes cereal in a cluster of rice cereal boxes, the local level filter 142 identifies the two boxes of corn flakes as a minority low-count item and the rice cereal as a majority high-count item. The global level filter 144 fails to remove the corn flakes items because the corn flakes are the same cereal category as the rice cereal, which is a confirmed category for the cereal aisle. The local level filter 142 removes the corn flake cereals from item-location results because the corn flakes are likely misplaced or false positives due to the surrounding abundance of rice cereals detected in the same location.

Alternatively, or in addition to the other embodiments described herein, embodiments include any combination of the following:

system for category-based item location filtering to remove false positives, the system;

obtain a plurality of candidate items associated with a recognized location within a retail facility;

each candidate item in the plurality of candidate items comprising an item recognized using an image of the candidate item and the recognized location by a set of recognition models;

perform a global level filtering on the plurality of candidate items removing any candidate items associated with an item category that is unconfirmed for the recognized location using a location-to-category mapping table and an item-to-category mapping table;

perform a local level filtering on the plurality of candidate items removing low count items present in a category-to-low count associated with the recognized location to eliminate false positive results associated with item-location recognition results generated by the set of recognition models;

generate an item-to-location mapping result comprising a mapping of each candidate item remaining within the plurality of candidate items to the recognized location following completion of the global level filtering and the local level filtering;

wherein the item-to-location mapping result is presented to a user via a user interface device for more accurate identification of item locations within the retail facility;

identifying a plurality of confirmed categories associated with the recognized location using the location-to-category mapping table;

comparing a category of each candidate item in the plurality of candidate items with the plurality of confirmed categories using ten item-to-category mapping table;

generating a set of unconfirmed category items and a set of confirmed category items from the plurality of candidate items;

wherein an item in the set of confirmed category items comprising a candidate item associated with a category matching a confirmed category in a plurality of confirmed categories associated with the recognized location;

removing the set of unconfirmed category items from the plurality of candidate items;

wherein an item in the set of unconfirmed category items comprises a candidate item associated with a category absent from the plurality of confirmed categories;

calculating an item count value for each item at the recognized location;

comparing the item count value for each item with a low-count threshold value;

comparing the item count value for each item with a majority threshold value;

wherein an item having an item count value which is less than a majority threshold is a low count item;

identifying a set of item-level low count items and a set of item-level high count items;

wherein an item in the set of item-level high count items is a candidate item having an item count at the recognized location that exceeds the low-count threshold;

removing the set of item-level low count items from the plurality of candidate items;

generating an item-to-location mapping for each unfiltered candidate item remaining in the plurality of candidate items for inclusion in a dynamic item-location map;

wherein an unfiltered item is an item that is absent from the set of unconfirmed category items and the set of item-level low count items;

responsive to the set of item-level high count items being a null set, identify a set of category-level high count items and a set of category-level low count items based on item count values for all items in a same category at the recognized location;

remove candidate items in the set of category-level low count items from the plurality of candidate items;

validate location-to-category mapping for a selected location within the retail facility using historical data to confirm each category associated with the selected location;

wherein a single category is assigned to the selected item, wherein a single location is assigned a plurality of categories;

wherein a single category is assigned to a plurality of locations;

generate an item-to-location mapping result having false positives filtered out for improved accuracy, the location-to-item mapping result comprising a plurality of entries;

wherein each entry comprises a mapping of a recognized item to a recognized location within the retail facility;

present the item-to-location mapping result to a user via a user interface device;

wherein an entry associated with an item-out is moved to a first position on the user interface device for viewing by the user;

obtaining, from a recognition model, a plurality of candidate items associated with a recognized location within a retail facility, each candidate item in the plurality of candidate items comprising an item recognized using an image of the candidate item and the recognized location generated by an image capture device;

removing a first set of candidate items associated with an item category that is unconfirmed for the recognized location using a global level filter, wherein each confirmed category for the recognized location is identifies using a location-to-category mapping table, and wherein the item category for each candidate item is obtained from an item-to-category mapping table;

removing a second set of candidate items form the plurality of candidate items having a low item-level count within the recognized location using a local level filter, wherein the second set of candidate items includes low count items absent from a set of category-to-high count items associated with the recognized location;

generating an item-to-location mapping result comprising a mapping of each candidate item remaining within the plurality of candidate items to reduce false positive item-location results generated by the recognition model;

performing a category-level local filtering comprising identifying a set of category-level high count items and a set of category-level low count items based on item count values for all items in a same category at the recognized location; and removing candidate items in the set of category-level low count items from the plurality of candidate items;

removing false positives associated with misplaced items within the retail facility and items detected within shopping baskets;

generating image data associated with the recognized location by an image capture device associated with a robotic device moving through the retail facility;

wherein the item-to-location mapping result is updated dynamically in real-time as additional images of the recognized location are received from the robotic device;

generating category-to-location mapping data for each category in a plurality of categories, wherein each category is assigned to at least one location within the retail facility;

generating the location-to-category mapping data for a selected location using planogram data, wherein the selected location is assigned a plurality of categories;

generating the item-to-category mapping for a selected item using item attribute data and per-category data, wherein a single category is assigned to the selected item;

identify a set of item-level high count items and a set of item-level low count items based on item count values for all items at the recognized location;

remove the candidate items in the set of item-level low count items from the plurality of candidate items;

apply zero bin tolerance metrics and one bin tolerance metrics to the item-to-location mapping results, wherein zero bin tolerance metrics specifies results accuracy to a selected bin and wherein one bin tolerance metrics specifies results accuracy to the selected bin or a bin adjacent to the selected bin;

generate the location-to-category mapping for a selected location within the retail facility using historical data and planogram data associated with a plurality of sections within the retail facility.

At least a portion of the functionality of the various elements in FIG. 1, FIG. 2, FIG. 3, FIG. 4 and FIG. 5 can be performed by other elements in FIG. 1, FIG. 2, FIG. 3, FIG. 4 and FIG. 5, or an entity (e.g., processor 106, web service, server, application program, computing device, etc.) not shown in FIG. 1, FIG. 2, FIG. 3, FIG. 4 and FIG. 5.

In some embodiments, the operations illustrated in FIG. 9, FIG. 10 and FIG. 11 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other embodiments, a computer readable medium having instructions recorded thereon which when executed by a computer device cause the computer device to cooperate in performing a method of filtering item location recognition results, the method comprising obtaining a plurality of candidate items associated with a recognized location within a retail facility, each candidate item in the plurality of candidate items comprising an item recognized using an image of the candidate item and the recognized location by a set of recognition models; performing a global level filtering on the plurality of candidate items removing any candidate items associated with an item category that is unconfirmed for the recognized location using a location-to-category mapping table and an item-to-category mapping table; applying a local level filtering on the plurality of candidate items removing low count items present in a category-to-low count associated with the recognized location to eliminate false positive results associated with item-location recognition results generated by the set of recognition models; and generating an item-to-location mapping result comprising a mapping of each candidate item remaining within the plurality of candidate items to the recognized location following completion of the global level filtering and the local level filtering, wherein the item-to-location mapping result is presented to a user via a user interface device for more accurate identification of item locations within the retail facility.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, embodiments of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other embodiments of the disclosure can include different computer-executable instructions or components having more functionality or less functionality than illustrated and described herein.

In embodiments involving a general-purpose computer, aspects of the disclosure transform the general-purpose computer into a special-purpose computing device when configured to execute the instructions described herein. The examples illustrated and described herein as well as examples not specifically described herein but within the scope of aspects of the disclosure constitute exemplary means for global and local category-based filtering of item recognition results. For example, the elements illustrated in FIG. 1, FIG. 2, FIG. 3, FIG. 4, and FIG. 5, such as when encoded to perform the operations illustrated in FIG. 9, FIG. 10 and FIG. 11, constitute exemplary means for obtaining a plurality of candidate items associated with a recognized location within a retail facility, each candidate item in the plurality of candidate items comprising an item recognized using an image of the candidate item and the recognized location by a set of recognition models; exemplary means for applying a global level filtering on the plurality of candidate items removing any candidate items associated with an item category that is unconfirmed for the recognized location using a location-to-category mapping table and an item-to-category mapping table; exemplary means for performing local level filtering on the plurality of candidate items removing low count items present in a category-to-low count associated with the recognized location to eliminate false positive results associated with item-location recognition results generated by the set of recognition models; and exemplary means for generating an item-to-location mapping result comprising a mapping of each candidate item remaining within the plurality of candidate items to the recognized location following completion of the global level filtering and the local level filtering, wherein the item-to-location mapping result is presented to a user via a user interface device for more accurate identification of item locations within the retail facility.

Other non-limiting examples provide one or more computer storage devices having a first computer-executable instructions stored thereon for providing global level filtering and local level filtering of item and location recognition computer vision results. When executed by a computer, the computer performs operations including removing a first set of candidate items associated with an item category that is unconfirmed for the recognized location using a global level filter, wherein each confirmed category for the recognized location is identifies using a location-to-category mapping table, and wherein the item category for each candidate item is obtained from an item-to-category mapping table; filtering a second set of candidate items form the plurality of candidate items having a low item-level count within the recognized location using a local level filter, wherein the second set of candidate items includes low count items absent from a set of category-to-high count items associated with the recognized location; and generating an item-to-location mapping result comprising a mapping of each candidate item remaining within the plurality of candidate items to reduce false positive item-location results generated by the recognition model.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to "A" only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for category-based item location filtering to remove false positives, the system comprising:
   an image capture device configured to generate image data within a retail facility;
   a user interface device including a display;
   a network enabling communication; and
   a computer-readable medium storing instructions that are operative upon execution by a processor to:
      receive, via the network, the image data generated by the image capture device;
      determine a location in the retail facility from the image data using a location recognition model;
      identify a plurality of candidate items associated with the determined location within a retail facility from the image data using an item recognition model;
      remove false positive items associated with misplaced items within the retail facility from the plurality of candidate items by:
         performing a global level filtering on the plurality of candidate items and removing any candidate items associated with an unconfirmed item category for the determined location using a location-to-category mapping table and an item-to-category mapping table; and
         performing a local level filtering on the plurality of candidate items and removing low count items associated with the determined location and determined, from the image data, to have a count value below a majority threshold value;
      generate an item-to-location mapping result comprising filtered items remaining in the plurality of candidate items following completion of the global level filtering and the local level filtering; and present the item-to-location mapping result to a user via the display of the user interface device for accurate identification of item locations within the retail facility.

2. The system of claim 1, wherein the global level filtering further comprises:
   identify a plurality of confirmed categories associated with the determined location using the location-to-category mapping table;
   compare a category of a candidate item in the plurality of candidate items with the plurality of confirmed categories using the item-to-category mapping table;
   generate a set of unconfirmed category items and a set of confirmed category items from the plurality of candidate items, wherein a confirmed category item in the set of confirmed category items comprises a candidate item associated with a confirmed category in the plurality of confirmed categories associated with the determined location; and
   remove the set of unconfirmed category items from the plurality of candidate items, wherein an unconfirmed category item in the set of unconfirmed category items comprises a candidate item associated with a category absent from the plurality of confirmed categories.

3. The system of claim 1, wherein the local level filtering further comprises:
   calculate an item count value for a selected item in the plurality of candidate items associated with the determined location;
   compare the item count value for the selected item with the majority threshold value, wherein the selected item having an item count value which is less than the majority threshold is a low count item;
   identify a set of item-level low count items and a set of item-level high count items, wherein a majority item in the set of item-level high count items is a candidate item having an item count at the determined location that is equal to or exceeds the majority threshold;
   remove the set of item-level low count items from the plurality of candidate items; and
   generate an item-to-location mapping for each unfiltered candidate item remaining in the plurality of candidate items for inclusion in a dynamic item-location map, wherein an unfiltered item is an item that is absent from a set of unconfirmed category items and the set of item-level low count items.

4. The system of claim 3, wherein the instructions are further operative to:
   responsive to the set of item-level high count items being a null set, identify a set of category-level high count items and a set of category-level low count items based on item count values for all items in a same category at the determined location; and
   remove candidate items in the set of category-level low count items from the plurality of candidate items.

5. The system of claim 1, wherein the instructions are further operative to:
   validate location-to-category mapping for a selected location within the retail facility using historical data to confirm each category associated with the selected location.

6. The system of claim 1, wherein a single category is assigned to a selected item, wherein a single location is assigned a plurality of categories.

7. The system of claim 1, wherein the item-to-location mapping result comprises a plurality of entries, wherein each entry comprises a mapping of a recognized item to the determined location within the retail facility, and wherein the instructions are further operative to:

present the item-to-location mapping result to the user via the user interface device, wherein an entry associated with an item-out is moved to a first position on the user interface device for viewing by the user.

8. A method for category-based item location filtering to remove false positives, the method comprising:

receiving, by a processor over a network, image data generated by an image capture device within a retail facility;

determining, by the processor, a location in the retail facility from the image data using a location recognition model;

identifying, by the processor, of a plurality of candidate items associated with the determined location from the image data using an item recognition model, wherein the item recognition model identifies the plurality of candidate items using an image generated by an image capture device;

removing, by the processor, false positive items associated with misplaced items within the retail facility from the plurality of candidate items by:

removing, by the processor using a global level filter, a first set of candidate items of the plurality of candidate items associated with an item category that is an unconfirmed category for the determined location, wherein the unconfirmed category is a category that is absent from a set of confirmed categories associated with the determined location; and removing, by the processor, a second set of candidate items form the plurality of candidate items having an item-level low count within the determined location using a local level filter to reduce false positives in the plurality of candidate items, wherein items of the second set of candidate items are determined, from the image data, to have a count value that falls below a majority threshold value associated with the determined location;

generating, by the processor, an item-to-location mapping result comprising a mapping of filtered items remaining within the plurality of candidate items to the determined location; and presenting, by the processor, the item-to-location mapping result to a user via a display of a user interface device for accurate identification of item locations within the retail facility.

9. The method of claim 8, further comprising:

identifying a set of category-level high count items and a set of category-level low count items based on item count values for all items in a same category at the determined location; and removing candidate items in the set of category-level low count items from the plurality of candidate items.

10. The method of claim 8, wherein the false positives items are associated with misplaced items within the retail facility and items detected within shopping baskets.

11. The method of claim 8, further comprising:

generating image data associated with the determined location by an image capture device associated with a robotic device moving through the retail facility, wherein the item-to-location mapping result is updated dynamically in real-time as additional images of the determined location are received from the robotic device.

12. The method of claim 8, further comprising:

generating category-to-location mapping data for each category in a plurality of categories, wherein each category is assigned to at least one location within the retail facility.

13. The method of claim 8, further comprising:

generating a location-to-category mapping data for a selected location using planogram data, wherein the selected location is assigned a plurality of categories.

14. The method of claim 8, further comprising:

generating an item-to-category mapping for a selected item using item attribute data and per-category data, wherein a single category is assigned to the selected item.

15. One or more computer storage devices having computer-executable instructions stored thereon, which, upon execution by a computer, are operative to:

receive, via a network, image data generated by an image capture device within a retail facility;

determine a location in the retail facility from the image data using a location recognition model;

identify a plurality of candidate items associated with determined location from the image data using an item recognition model, each candidate item in the plurality of candidate items comprising an item recognized by the item recognition model using an image of the candidate item and the determined location by the location recognition model;

remove false positive items associated with misplaced items within the retail facility from the plurality of candidate items by:

performing a global level filtering on the plurality of candidate items comprising identifying a set of unconfirmed category items and a set of confirmed category items in the plurality of candidate items using an item-to-category mapping table, an item in the set of confirmed category items comprising a candidate item associated with a category matching a confirmed category in a plurality of confirmed categories associated with the determined location;

removing the set of unconfirmed category items from the plurality of candidate items, wherein each item in the set of unconfirmed category items comprises a candidate item associated with a category absent from the plurality of confirmed categories;

performing a local level filtering on the set of confirmed category items, the local level filtering comprising identifying a set of item-level low count items determined, from the image data, to have an item count value within the determined location less than a majority threshold value;

removing the set of item-level low count items from the plurality of candidate items;

map, by an item-to-location mapping, a set of candidate items remaining in the plurality of candidate items following global level filtering and local level filtering to remove false positives associated with the item recognition models and the location recognition model; and present the item-to-location mapping to a user via a display of a user interface device for accurate identification of item locations within the retail facility.

16. The one or more computer storage devices of claim 15, wherein the operations further comprise:

identify a set of item-level high count items and a set of item-level low count items based on item count values for all recognized items at the determined location; and remove the candidate items in the set of item-level low count items from the plurality of candidate items.

17. The one or more computer storage devices of claim 15, wherein the operations further comprise:

apply zero bin tolerance metrics and one bin tolerance metrics to item-to-location mapping results.

18. The one or more computer storage devices of claim 15, wherein the operations further comprise:

generate a location-to-category mapping for a selected location within the retail facility using historical data and planogram data associated with a plurality of sections within the retail facility.

19. The one or more computer storage devices of claim 15, wherein the operations further comprise:

responsive to a set of item-level high count items being a null set, identify a set of category-level high count items and a set of category-level low count items based on item count values for all items in a same category at the determined location; and remove candidate items in the set of category-level low count items from the plurality of candidate items.

20. The one or more computer storage devices of claim 15, wherein the operations further comprise:

generate an item-to-location mapping result having false positives filtered out for improved accuracy, a location-to-item mapping result comprising a plurality of entries, wherein each entry comprises a mapping of a recognized item to the determined location within the retail facility; and present the item-to-location mapping result to a user via a user interface device, wherein an entry associated with an item-out is moved to a first position on the user interface device for viewing by the user.

* * * * *